United States Patent
Krauss et al.

(10) Patent No.: US 12,066,350 B2
(45) Date of Patent: Aug. 20, 2024

(54) DETERMINING THE COMPOSITION OF A COMBUSTION GAS

(71) Applicant: MAN Truck & Bus SE, Munich (DE)

(72) Inventors: Heiko Krauss, Munich (DE); Torsten Gehrmann, Munich (DE)

(73) Assignee: MAN Truck & Bus SE, Munich (DE)

( * ) Notice: Subject to any disclaimer, the term of this patent is extended or adjusted under 35 U.S.C. 154(b) by 0 days.

(21) Appl. No.: 18/007,477

(22) PCT Filed: Jul. 12, 2021

(86) PCT No.: PCT/EP2021/069295
§ 371 (c)(1),
(2) Date: Jan. 30, 2023

(87) PCT Pub. No.: WO2022/023004
PCT Pub. Date: Feb. 3, 2022

(65) Prior Publication Data
US 2023/0296478 A1    Sep. 21, 2023

(30) Foreign Application Priority Data

Jul. 29, 2020   (DE) .......................... 102020119960.6

(51) Int. Cl.
*G01M 15/05*     (2006.01)
*F02D 41/00*     (2006.01)
(Continued)

(52) U.S. Cl.
CPC ........... *G01M 15/05* (2013.01); *F02D 41/005* (2013.01); *F02D 41/1446* (2013.01);
(Continued)

(58) Field of Classification Search
CPC .. G01M 15/05; F02D 41/005; F02D 41/1446; F02D 41/1454; F02D 41/1461;
(Continued)

(56) References Cited

U.S. PATENT DOCUMENTS

| | | | |
|---|---|---|---|
| 2011/0154821 A1* | 6/2011 | Evans-Beauchamp | ...................... F02D 41/1448 73/114.37 |
| 2013/0245919 A1* | 9/2013 | Kumar | ................ F02D 41/0295 701/104 |

(Continued)

FOREIGN PATENT DOCUMENTS

| DE | 102004060893 A1 | 9/2005 |
|---|---|---|
| DE | 102007010339 A1 | 9/2008 |

(Continued)

OTHER PUBLICATIONS

Machine Translation of EP-1467149-A1 (Year: 2004).*

(Continued)

*Primary Examiner* — Brandon D Lee
(74) *Attorney, Agent, or Firm* — Maginot, Moore & Beck LLP

(57) ABSTRACT

A method for determining a combustion gas composition of a combustion gas for an internal combustion engine includes operating the engine, and establishing an operating point of the internal combustion engine during operation. The method also includes detecting a nitrogen oxide emission of the internal combustion engine at the operating point. The method further includes detecting an exhaust gas temperature of the internal combustion engine at the operating point, and detecting a combustion air ratio of the internal combustion engine at the operating point. The combustion gas composition of the combustion gas is determined based on the operating point, the detected nitrogen oxide emission, the detected exhaust gas temperature and the detected combustion air ratio.

15 Claims, 2 Drawing Sheets

(51) Int. Cl.
  *F02D 41/14*  (2006.01)
  *F02P 5/15*  (2006.01)
(52) U.S. Cl.
  CPC ..... *F02D 41/1454* (2013.01); *F02D 41/1461*
    (2013.01); *F02P 5/1502* (2013.01); *F02D*
    *2200/101* (2013.01); *F02D 2200/70* (2013.01)
(58) Field of Classification Search
  CPC .......... F02D 2200/101; F02D 2200/70; F02D
      2200/0612; F02D 41/0027; F02D 19/029;
          F02P 5/1502; Y02T 10/30
  See application file for complete search history.

(56) References Cited

U.S. PATENT DOCUMENTS

| | | | | |
|---|---|---|---|---|
| 2014/0360471 | A1* | 12/2014 | Sugiyama | F02D 19/029 |
| | | | | 123/457 |
| 2017/0268438 | A1* | 9/2017 | Flohr | F02D 19/0636 |
| 2018/0372013 | A1* | 12/2018 | Turlapati | F02D 35/027 |
| 2022/0186674 | A1* | 6/2022 | Dilawari | F02D 41/403 |

FOREIGN PATENT DOCUMENTS

| | | | | |
|---|---|---|---|---|
| DE | 102014209957 | A1 | 11/2015 | |
| DE | 102014216874 | A1 | 2/2016 | |
| DE | 102017000860 | A1 | 8/2017 | |
| DE | 102017218746 | A1 | 3/2019 | |
| EP | 1467149 | A1 * | 10/2004 | ............. F23N 1/022 |
| EP | 1467149 | A1 | 10/2004 | |
| WO | 2013000030 | A1 | 1/2013 | |
| WO | 2013093598 | A1 | 6/2013 | |
| WO | 2015104772 | A1 | 7/2015 | |

OTHER PUBLICATIONS

International Search Report corresponding to International Patent Application No. PCT/EP2021/069295 dated Nov. 4, 2021. (6 Pages).
German Search Report corresponding to German Patent Application No. 102020119960.0 dated Apr. 16, 2021. (5 Pages).

* cited by examiner

DETERMINING THE COMPOSITION OF A COMBUSTION GAS

The present application is the U.S. national phase of PCT Application PCT/EP2021/069295 filed on Jul. 12, 2021, which claims priority of German patent application No. 10 2020 119 960.0 filed on Jul. 29, 2020, which is incorporated herein by reference in its entirety.

The invention relates to a method for determining a combustion gas composition for an internal combustion engine. The invention further relates to an internal combustion engine.

A significant challenge for in particular stationary gas engines is to obtain a clean, efficient and flexible energy provision on the basis of extremely different fuel qualities. Firstly, the motor-based combustion of natural gas from the natural gas network should be mentioned. A distinction is made in this instance between "natural gas H/high" and "natural gas L/low". High-calorific natural gas has considerably higher concentrations of methane and is significantly more combustible than low-calorific natural gas. In the future, it is additionally sought, using the Power-to-Gas method, to increase the hydrogen proportion in the natural gas, whereby the gas quantities fluctuate even further. Also of great significance is the provision of energy from biogas, which depending on the coating of the fermenter differs with regard to the methane and carbon dioxide content. An additional source of engine combustion gases is wood gas which is composed for the most part of carbon dioxide, methane and hydrogen. Also significant is the synthesis gas provided by industrial processes, for example, from plastics waste, which is suitable in the context of an optimized use of resources for power and heat production by combustion engines. As a result of the sometimes significantly fluctuating gas composition, there are significant differences with regard to the combustion properties. Without any knowledge of the current gas quality, motor adaptations are hardly possible. This ultimately leads with high proportions of inert gas to a direct loss of efficiency as a result of a high thermal discharge and unfavorable combustion position. In contrast, the knock control with very combustible gases ensures that, as a result of adaptation of the ignition angle, disadvantages arise with regard to the degree of efficiency. For this reason, in gas engines which are operated with different combustion gas qualities, it may be desirable to implement a combustion gas composition recognition or a gas quality recognition and to integrate this into the engine control circuit.

DE 10 2017 218 746 A1 discloses a method for operating an internal combustion engine, wherein a combustion gas/combustion air admixture is supplied for combustion to a combustion chamber of the internal combustion engine. At least one gas parameter which is characteristic of the reactivity of the combustion gas is detected. The at least one characteristic gas parameter is detected as a combustion chamber pressure value or a combustion chamber pressure path. The measuring device is in the form of a combustion chamber pressure sensor. Alternatively, it is possible for the at least one characteristic gas parameter to be determined upstream of the combustion chamber as a result of a gas analysis by means of gas chromatography.

DE 10 2017 000 860 A1 discloses systems, methods and apparatuses for controlling the operation of an engine which is constructed to burn gaseous fuel including an estimation of key parameters which are dependent on the quality of the natural gas. The natural gas quality parameters are estimated from the natural gas properties, which have been obtained from various detected parameters which are associated with the engine. The gas quality parameters are a parameter G (sometimes referred to as lambda parameter G), a specific weight which is associated with a gaseous fuel, a methane value which is associated with a gaseous fuel, a lower thermal value which is associated with a gaseous fuel and a Wobbe index which is associated with a gaseous fuel.

An object of the invention is to provide an alternative and/or improved technique for establishing a combustion gas composition.

The object is achieved by the features of the independent claim 1. Advantageous further developments are set out in the dependent claims and in the description.

One aspect relates to a method for determining a combustion gas composition of a combustion gas for an (for example, stationary) internal combustion engine (for example, four-stroke gaseous fuel reciprocating internal combustion engine). The method involves operating the internal combustion engine with a combustion gas (for example, in order to maintain a constant nitrogen oxide emission, preferably crude nitrogen oxide emission). The method involves establishing an operating point of the internal combustion engine during operation of the internal combustion engine (for example, by means of at least one physical and/or virtual sensor). The method involves detecting a nitrogen oxide emission, preferably a crude nitrogen oxide emission, of the internal combustion engine at the operating point (for example, by means of a nitrogen oxide sensor and/or a virtual sensor). The method involves detecting an exhaust gas temperature of the internal combustion engine at the operating point (for example, by means of a temperature sensor and/or a virtual sensor). The method involves detecting a combustion air ratio of the internal combustion engine at the operating point (for example by means of a lambda sensor and/or a virtual sensor). The method involves determining the combustion gas composition of the combustion gas based on the operating point, the detected nitrogen oxide emission, the detected exhaust gas temperature and the detected combustion air ratio.

Advantageously, the method may enable a combustion gas composition to be determined without complex additional measuring technology (for example, gas chromatograph, combustion chamber pressure sensor, etcetera). Instead, it has been recognized that a determination of the combustion gas composition of the combustion gas is possible only on the basis of simple measurement variables (nitrogen oxide emission, exhaust gas temperature, combustion air ratio) which can in any case be detected and processed in an internal combustion engine for other purposes. Each combustion gas composition has for each operating point a "fingerprint" of these simple measurement variables. Significantly reduced investment costs compared with the complex additional measurement technology can thereby be produced. The correlation of the measurement variables for establishing the combustion gas composition can additionally behave in the same manner regardless of the engine type. The present technology may consequently be able to be used for all four-stroke combustion gas internal combustion engines, regardless of the respective operating or combustion method. On the basis of the established combustion gas composition, the engine operating parameters may, for example, be adjusted in an optimum manner with regard to the degree of efficiency, emissions and engine protection.

Preferably, the determination of the combustion gas composition is not based on a measurement value of a gas chromatograph, a gas analyzer, a combustion chamber pressure sensor, a thermal value sensor and/or a gas density sensor.

In one embodiment, the determination of the combustion gas composition involves at least one of establishing an inert gas proportion, preferably a carbon dioxide content, of the combustion gas, and establishing a hydrocarbon content, preferably a methane content and/or an ethane content, of the combustion gas.

In another embodiment, the determination of the operating point involves at least one of establishing an ignition time of the internal combustion engine (for example, from control values of a control unit), establishing (for example, detecting) a speed of the internal combustion engine (for example, by means of a speed sensor and/or a virtual sensor), and establishing a load of the internal combustion engine. Preferably, the operating point can be illustrated or depicted as a combination of various operating parameters.

In a further development, the determination of the load is based on detection of a suction pipe pressure of the internal combustion engine (for example, by means of a pressure sensor and/or a virtual sensor) or the determination of the load is based on detection of an electrical apparent power of a generator which is driven by the internal combustion engine (for example, by means of a current/voltage measuring unit and/or a virtual sensor).

In another embodiment, the determination of the operating point further involves detecting a supply temperature, for example, admixture supply temperature, preferably combustion air/combustion gas admixture temperature or combustion air/combustion gas/exhaust gas admixture temperature) and/or a supply pressure (for example, admixture supply pressure, preferably combustion air/combustion gas admixture pressure or combustion air/combustion gas admixture pressure), preferably directly, upstream of a compressor of a turbocharger of the internal combustion engine (for example, by means of a temperature sensor and/or a pressure sensor and/or a virtual sensor). Consequently, the operating point can be illustrated even more precisely.

In one embodiment, the determination of the operating point further involves detecting an exhaust gas temperature and/or an exhaust gas pressure, preferably directly, downstream of an exhaust gas turbine of a turbocharger of the internal combustion engine (for example, by means of an exhaust gas temperature sensor and/or an exhaust gas pressure sensor and/or a virtual sensor). Advantageously, the operating point can thus be illustrated even more precisely.

In another embodiment, the determination of the operating point further involves detecting ambient conditions, preferably an air pressure, an air humidity and/or a dew point (for example, by means of an ambient air temperature sensor, an ambient temperature sensor and/or a virtual sensor). Advantageously, the operating point can thus also be illustrated even more precisely.

In another embodiment, the method further involves detecting an admixture temperature (for example, a combustion gas/combustion air admixture temperature or a combustion air/exhaust gas admixture temperature) upstream of a main combustion chamber of the internal combustion engine, preferably in a suction pipeline of the internal combustion engine. The determination of the combustion gas composition of the combustion gas is further based on the detected admixture temperature. Preferably, the determination of the combustion gas composition can consequently be made more precise.

In one variant, the method further involves detecting an exhaust gas pressure upstream of an exhaust gas turbine of a turbocharger of the internal combustion engine, wherein the determination of the combustion gas composition of the combustion gas is further based on the detected exhaust gas temperature upstream of the exhaust gas turbine. Advantageously, the determination of the combustion gas composition can consequently be made more precise.

In another variant, the method further involves detecting structure-borne noise from a combustion during operation of the internal combustion engine, wherein the determination of the combustion gas composition of the combustion gas is further based on the detected structure-borne noise. The determination of the combustion gas composition can thus also be made more precise. In addition, for example, a series dispersion and/or a wear state of the internal combustion engine during the determination of the combustion gas composition can be taken into account.

In one embodiment, the determination of the combustion gas composition of the combustion gas is carried out by means of a predetermined (for example, simulatively and/or empirically established) association (for example, having at least one characteristic field, at least one table, at least one algorithm, at least one calculation rule or model, etcetera), wherein the pre-determined association preferably illustrates that, for an engine operating point and constant crude nitrogen oxide emissions with a falling combustion air ratio and increasing exhaust gas temperature, an inert gas proportion of the combustion gas composition increases.

Preferably, the association can associate the combustion gas composition with the established operating point, the detected nitrogen oxide emissions, the detected combustion air ratio and the detected exhaust gas temperature (and optionally additional parameters and/or characteristic values) by means of a predetermined correlation.

In another embodiment, the method further involves adapting an operation of the internal combustion engine in accordance with the established combustion gas composition.

In a further development, the adaptation of the operation of the internal combustion engine involves adapting an exhaust gas return rate in accordance with the established combustion gas composition, preferably with an increase of the exhaust gas return rate with a reduction of an inert gas proportion of the established combustion gas composition.

In another variant, the adaptation of the operation of the internal combustion engine involves adapting an ignition time of the internal combustion engine.

Another aspect of the present disclosure relates to an (for example, stationary) internal combustion engine having a control unit which is configured to carry out a method according to any one of the preceding claims.

Preferably, the term "control unit" may refer to an electronic system (for example, having microprocessor(s) and data stores) which depending on the configuration can perform control functions and/or regulation functions and/or processing functions. Even when the term "control" is used herein, this may also so to speak advantageously include or mean "regulate" or "control with feedback" and/or "process".

Preferably, the internal combustion engine may have any sensor for detecting any parameter/characteristic value of the method disclosed herein.

It is also possible to use the apparatus as disclosed herein for passenger vehicles, utility vehicles (for example, trucks or buses), large engines, off-road vehicles, stationary engines, marine engines, etcetera.

The preferred embodiments and features of the invention described above can be freely combined with each other.

Further details and advantages of the invention are described below with reference to the appended drawings, in which.

Figure 1:
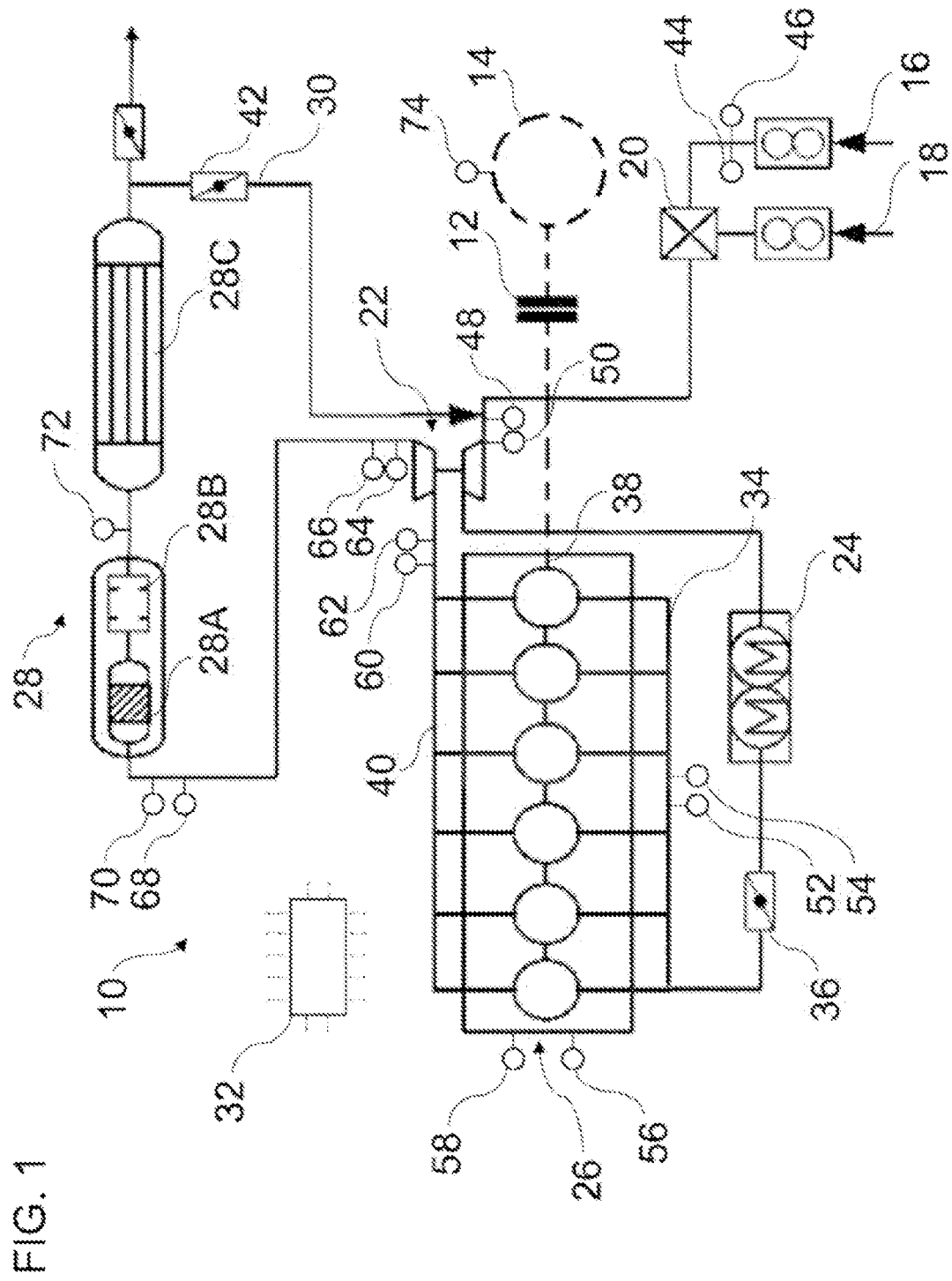
FIG. 1 shows a schematic illustration of an internal combustion engine.

FIG. 1 shows an internal combustion engine 10. The internal combustion engine 10 is in the form of a four-stroke gas fuel reciprocating internal combustion engine for burning a combustion gas. The internal combustion engine 10 may be included in a mobile machine or a vehicle, for example, for driving the vehicle. Preferably, the vehicle is a utility vehicle, for example, bus or truck. In a particularly preferred manner, however, the internal combustion engine 10 is a stationary internal combustion engine, for example, in a power station for power generation. The internal combustion engine 10 can be drivingly connected by means of a coupling 12 to a generator 14 for power generation.

The supply of the gas fuel or combustion gas for combustion in the internal combustion engine 10 can be carried out using any technology. For example, the gas fuel can be blown directly into the combustion chamber(s) of the internal combustion engine 10. Alternatively, the gas fuel may be metered, for example, in a cylinder-specific manner, via metering valves (for example, electromagnetically activated gas supply valves—SOGAV (solenoid operated gaseous fuel admission valve) into inlet channels of the cylinder heads or the cylinder head of the internal combustion engine 10. Alternatively, the combustion gas may also be mixed with the combustion air upstream of the cylinder head or the cylinder heads, as will be explained below by way of example with reference to FIG. 1.

The internal combustion engine 10 may have a combustion air supply 16, a combustion gas supply 18, a gas mixer 20, at least one turbocharger 22, an admixture cooler 24, main combustion chambers 26, an exhaust gas aftertreatment system 28 and an exhaust gas return line 30. The internal combustion engine 10 may further have a control unit 32.

Combustion air from the combustion air supply 16 and combustion gas from the combustion gas supply 18 are mixed in the gas mixer 20 to form a combustion gas/combustion air admixture. The combustion gas/combustion air admixture is supplied to a compressor of the turbocharger. The compressor of the turbocharger 22 compresses the combustion gas/combustion air admixture and heats it. The admixture cooler 24 cools the heated combustion gas/combustion air admixture. The admixture is supplied via a suction pipeline 34 of the internal combustion engine 10 to the main combustion chambers 26. In order to adjust an admixture quantity, a throttle valve 36 can be adjusted upstream of the main combustion chambers 26.

It is possible for exhaust gas from the exhaust gas return line 30 to be mixed in the combustion gas/combustion air admixture, for example, upstream or downstream of the compressor of the turbocharger 22 or the admixture cooler 24.

The admixture is burnt in the main combustion chambers 26. As a result of the combustion in the main combustion chambers 26, a crankshaft 38 is driven. The crankshaft 38 drives, for example, drive wheels of the vehicle or the generator 14. The combusted admixture is directed as exhaust gas out of the main combustion chambers 26 into an exhaust gas collection line 40.

The exhaust gas collection line 40 guides the exhaust gas to an exhaust gas turbine of the turbocharger 22. In the exhaust gas turbine, the pressure of the exhaust gas is reduced, whereby the exhaust gas turbine and consequently the compressor of the turbocharger 22 are driven. Downstream of the exhaust gas turbine of the turbocharger 22, the exhaust gas is directed to the exhaust gas aftertreatment system 28. The exhaust gas aftertreatment system 28 may, for example, have at least one particulate filter 28A and/or catalytic converter 28B (for example, oxidation catalytic converter and/or SCR catalytic converter) and/or heat exchanger 28C for treating the exhaust gas. Downstream of the exhaust gas aftertreatment system 28, the exhaust gas can be discharged into the atmosphere or returned through the exhaust gas return line 30 to the inlet side of the internal combustion engine 10. A returned quantity of exhaust gas may, for example, be adjusted by means of a throttle valve 42 in the exhaust gas return line 30.

The control unit 32 is configured to control operation of the internal combustion engine 10. Preferably, the control unit 32 is constructed to carry out a method for determining a combustion gas composition as disclosed herein. The control unit 32 may to this end be connected to a plurality of sensors 44 to 72. Even when the sensors 44 to 72 are described below in the form of real sensors, it is possible for the sensors 44 to 72 to be at least partially in the form of virtual sensors or soft sensors.

For example, the internal combustion engine 10 may have an air pressure sensor 44 for detecting an ambient air pressure and/or an air humidity sensor 46 for detecting an ambient air humidity. The air pressure sensor 44 and the air humidity sensor 46 may be arranged on the combustion air supply 16.

The internal combustion engine 10 may have a pressure sensor 48 and/or a temperature sensor 60 upstream of the compressor of the turbocharger 22. The pressure sensor 48 can detect a pressure of the admixture which flows into the compressor of the turbocharger 22. The temperature sensor 50 can detect a temperature of the admixture flowing into the compressor of the turbocharger 22. Preferably, the pressure sensor 48 and the temperature sensor 50 are arranged directly on a compressor inlet of the turbocharger 22.

The internal combustion engine 10 may have a pressure sensor 52 and/or a temperature sensor 54 in the suction pipeline 34 downstream of the compressor of the turbocharger 22 and upstream of the main combustion chambers 26 of the internal combustion engine 10. The pressure sensor 52 can detect a suction pipe pressure of the admixture in the suction pipeline 34. The temperature sensor 54 can detect a temperature of the admixture in the suction pipeline 34.

The internal combustion engine 10 may have at least one structure-borne noise sensor 56 and/or speed sensor 58. The at least one structure-borne noise sensor 56 may be in the form of a knock sensor for detecting knocking noise emissions during the combustion in the main combustion chambers 26. The speed sensor 58 may be configured to detect a speed of the crankshaft 38.

The internal combustion engine 10 may have a pressure sensor 60 and/or a temperature sensor 62. The pressure sensor 60 detects an exhaust gas pressure. The temperature sensor 62 detects an exhaust gas temperature. The pressure sensor 60 and the temperature sensor 62 are arranged upstream of the exhaust gas turbine of the turbocharger 22, for example, at an outlet of the exhaust gas collection line 40 or in the exhaust gas collection line 40.

The internal combustion engine 10 may have a pressure sensor 64 and/or a temperature sensor 66. The pressure sensor 64 detects an exhaust gas pressure. The temperature sensor 66 detects an exhaust gas temperature. The pressure sensor 64 and the temperature sensor 66 are arranged downstream of the exhaust gas turbine of the turbocharger 22, for example, directly at a turbine outlet of the turbocharger 22.

The internal combustion engine 10 may have a nitrogen oxide sensor 68, a first lambda sensor 70 and/or a second lambda sensor 72. The nitrogen oxide sensor 68 can detect a nitrogen oxide content, preferably a crude nitrogen oxide content, in the exhaust gas. The first and second lambda sensors 70, 72 can detect a combustion air ratio. The nitrogen oxide sensor 68 and the first lambda sensor 70 are arranged upstream of the exhaust gas aftertreatment system 28 for example, downstream of the exhaust gas collection line 40 and/or the exhaust gas turbine of the turbocharger 22. The second lambda sensor 72 is arranged inside or downstream of the exhaust gas aftertreatment system 28, for example, directly downstream of the exhaust gas aftertreatment system 28.

It is possible for a voltage and current measurement device 74 to be connected to the generator 14 in order to establish an electrical apparent power.

Figure 2:
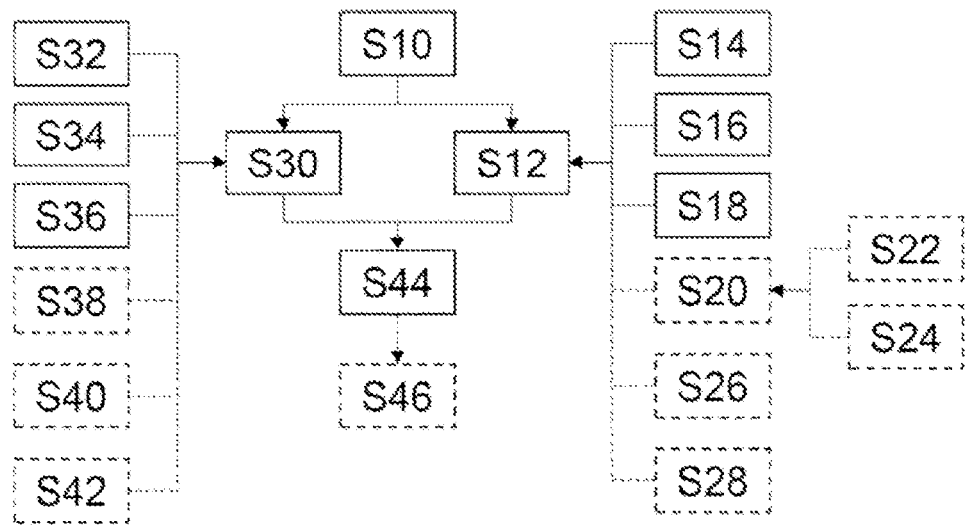
FIG. 2 shows a schematic illustration of a method for establishing a combustion gas composition.

FIG. 2 shows an exemplary method for determining a combustion gas composition which is described by way of example with reference to the internal combustion engine of FIG. 1.

In step S10, the internal combustion engine 10 is operated at an engine operating point. In principle, for example, the internal combustion engine 10 can be operated in such a manner that the crude nitrogen oxide emissions thereof, for example, the ones detected by the nitrogen oxide sensor 68, are kept substantially constant.

In a step S12, the engine operating point at which the internal combustion engine 10 is operated is established. The engine operating point can be depicted as a combination of different engine parameters. The engine operating point is in particular depicted or illustrated by a motor speed, a load and an ignition time. In a step S14, the engine speed can therefore be detected by means of the speed sensor 58. In a step S16, the load of the internal combustion engine can be depicted by the suction pipe pressure (detected by means of the pressure sensor 52). Alternatively, for example, the load may be depicted by means of the electrical apparent power which can be established by means of the voltage and current measurement unit 74. In a step S16, the ignition time of the internal combustion engine 10 can be established, for example, from control data for controlling at least one ignition device of the internal combustion engine 10. The ignition device may, for example, be a spark plug or a corona ignition device or the like.

It is possible for other conditions to be detected or established in order to be able to depicted the engine operating point even more precisely. In a step S20, for example, ambient conditions can be detected. Preferably, in a step S22, an ambient air pressure can be detected by means of the air pressure sensor 44 and, in a step S24, an ambient air humidity or a dew point can be detected by means of the air humidity sensor 46. Alternatively or additionally, in a step S26, an admixture pressure and an admixture temperature can be detected upstream of the compressor of the turbocharger 22 by means of the pressure sensor 48 and the temperature sensor 50. Alternatively or additionally, in a step S28, an exhaust gas pressure and an exhaust gas temperature downstream of the exhaust gas turbine of the turbocharger 22 can be detected by means of the pressure sensor 64 and the temperature sensor 66.

In a step S30, different operating parameters or characteristic values of the internal combustion engine 10 can be detected. These parameters or characteristic values provide so to speak a characteristic fingerprint for the combustion of the combustion gas of the internal combustion engine 10 so that a conclusion can be drawn regarding the composition of the combustion gas. In the steps S32 to S36, values which are particularly relevant for this are detected. In the step S32, the crude nitrogen oxide proportion in the exhaust gas is detected by means of the nitrogen oxide sensor. In the step S34, an exhaust gas temperature of the exhaust gas is detected by means of the temperature sensor 62. In the step S36, a combustion air ratio is detected by means of the first lambda sensor 70 and/or the second lambda sensor 72.

It is possible for other parameters or characteristic values to be detected or established in order to be able to depict the characteristic fingerprint for the combustion of the combustion gas even more precisely. For example, in a step S38, an admixture temperature in the suction pipeline 34 can be detected by means of the temperature sensor 54. Alternatively or additionally, in a step S40, an exhaust gas pressure upstream of the exhaust gas turbine of the turbocharger 22 can be established by means of the pressure sensor 60. Alternatively or additionally, in a step S42, a structure-borne noise during combustion of the combustion gas in the main combustion chambers 26 can be detected by means of the at least one structure-borne noise sensor 56. The structure-borne noise signal can, for example, be used to take into account a series dispersion and a wear state of the internal combustion engine 10.

In a step S44, a combustion gas composition of the combustion gas burnt in the main combustion chambers 26 of the internal combustion engine 10 is established based on a correlation of the established engine operating point with the detected parameters or characteristic values. To this end, for example, a mathematical model, lookup tables, algorithms, characteristic fields, etcetera, which have been simulatively and/or empirically established and which are preferably stored in the control unit 32 can be used. The determination of the combustion gas composition can preferably be carried out with regard to an inert gas proportion of the combustion gas, as explained by way of example below with reference to FIG. 3.

Figure 3:
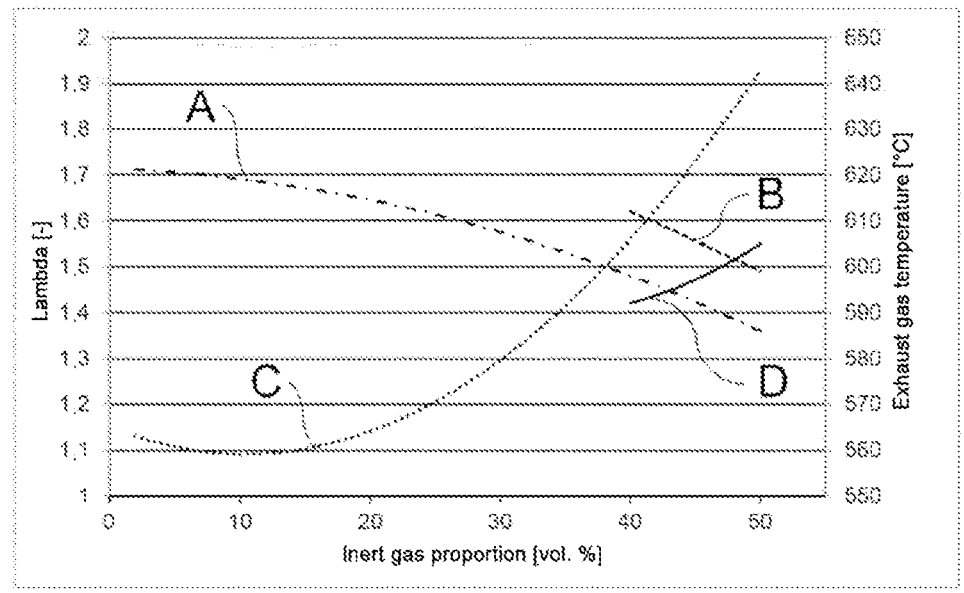
FIG. 3 shows a schematic inert gas proportion/lambda value/exhaust gas temperature graph.

FIG. 3 shows four different curves A to D for an engine operating point and an operation with consistent crude nitrogen oxide emission. The dot-dash curve A shows a lambda value path depending on the inert gas proportion of the combustion gas for an ignition time 25° before TDC (top dead center). The dashed curve B shows a lambda value path depending on the inert gas proportion of the combustion gas for an ignition time 30° before TDC. The dotted curve C shows an exhaust gas temperature path depending on the inert gas proportion of the combustion gas for an ignition time 25° before TDC. The solid curve D shows an exhaust gas temperature path depending on the inert gas proportion of the combustion gas for an ignition time 30° before TDC. During a comparison of the curves A to D, it can be seen that at a constant crude nitrogen oxide emission with an increasing inert gas proportion, the exhaust gas temperature increases, whereas the lambda value or the combustion air ratio decreases.

In order to make the determination of the combustion gas composition more precise, the values which can additionally be detected or established with the steps S20-S28 and S38-S42 can additionally be at least partially taken into account if desired in the correlation in order to determine the combustion gas composition.

With reference again to FIG. 2, in a step S46, an operation of the internal combustion engine 10 can be adapted to the established combustion gas composition, if desired. For example, a returned exhaust gas quantity can be adapted in accordance with the combustion gas composition. An exhaust gas return rate may, for example, be adjusted to be smaller the greater the inert gas proportion established in the combustion gas is. Alternatively or additionally, for example, an ignition (for example, an ignition time and/or an ignition energy) of the admixture in the main combustion chambers 26 of the internal combustion engine 10 could be adapted.

The invention is not limited to the preferred embodiments described above. Instead, a large number of variants and modifications which also make use of the notion of the invention and which are therefore included within the protective scope are possible. In particular, the invention also claims protection for the subject-matter and the features of the dependent claims regardless of the claims which are taken into account. In particular, the individual features of the independent claim 1 are disclosed independently of each other. In addition, the features of the dependent claims are also disclosed independently of all the features of the independent claim 1.

| List of reference numerals | |
| --- | --- |
| 10 | Internal combustion engine |
| 12 | Coupling |
| 14 | Generator |
| 16 | Combustion air supply |
| 18 | Combustion gas supply |
| 20 | Gas mixer |
| 22 | Turbocharger |
| 24 | Admixture cooler |
| 26 | Main combustion chambers |
| 28 | Exhaust gas aftertreatment system |
| 28A | Particulate filter |
| 28B | Catalytic converter |
| 28C | Heat exchanger |
| 30 | Exhaust gas return line |
| 32 | Control unit |
| 34 | Suction pipeline |
| 36 | Throttle valve |
| 38 | Crankshaft |
| 40 | Exhaust gas collection line |
| 42 | Throttle valve |
| 44 | Air pressure sensor |
| 46 | Air humidity sensor |
| 48 | Pressure sensor |
| 50 | Temperature sensor |
| 52 | Pressure sensor |
| 54 | Temperature sensor |
| 56 | Structure-borne noise sensor |
| 58 | Speed sensor |
| 60 | Pressure sensor |
| 62 | Temperature sensor |
| 64 | Pressure sensor |
| 66 | Temperature sensor |
| 68 | Nitrogen oxide sensor |
| 70 | First lambda sensor |
| 72 | Second lambda sensor |
| 74 | Voltage and current measuring unit |
| S10-S46 | Method steps |
| A | First inert gas proportion lambda curve |
| B | Second inert gas proportion temperature curve |
| C | First inert gas proportion/exhaust gas temperature curve |
| D | Second inert gas proportion/exhaust gas temperature curve |

The invention claimed is:

1. A method for determining a combustion gas composition of a combustion gas for an internal combustion engine, comprising:
operating the internal combustion engine with the combustion gas;
establishing an operating point of the internal combustion engine during operation of the internal combustion engine, wherein the establishing of the operating point involves at least one of the group comprising,
establishing an ignition time of the internal combustion engine;
establishing a speed of the internal combustion engine; and
establishing a load of the internal combustion engine;
detecting a nitrogen oxide emission of the internal combustion engine at the operating point;
detecting an exhaust gas temperature of the internal combustion engine at the operating point;
detecting a combustion air ratio of the internal combustion engine at the operating point;
determining the combustion gas composition of the combustion gas based on the operating point, the detected nitrogen oxide emission, the detected exhaust gas temperature and the detected combustion air ratio, wherein the determination of the combustion gas composition involves at least one of the group comprising,
establishing an inert gas proportion of the combustion gas; and
establishing a hydrocarbon content of the combustion gas; and
adapting an operation of the internal combustion engine in accordance with the established combustion gas composition.

2. The method as claimed in claim 1, wherein:
the establishing of the load is based on detection of a suction pipe pressure of the internal combustion engine; or
the establishing of the load is based on detection of an electrical apparent power of a generator which is driven by the internal combustion engine.

3. The method as claimed in claim 2, wherein the establishing of the operating point further comprises:
detecting a supply temperature and/or a supply pressure upstream of a compressor of a turbocharger of the internal combustion engine.

4. The method as claimed in claim 1, wherein the establishing of the operating point further comprises:
detecting a supply temperature and/or a supply pressure upstream of a compressor of a turbocharger of the internal combustion engine.

5. The method as claimed in claim 1, wherein the establishing of the operating point further involves:
detecting an exhaust gas temperature and/or an exhaust gas pressure downstream of an exhaust gas turbine of a turbocharger of the internal combustion engine.

6. The method as claimed in claim 1, wherein the establishing of the operating point further comprises detecting ambient conditions.

7. The method as claimed in claim 6, wherein the ambient conditions comprise an air pressure, an air humidity and/or a dew point.

8. The method as claimed in claim 1, further comprising:
detecting an admixture temperature upstream of a main combustion chamber of the internal combustion engine;
wherein the determination of the combustion gas composition of the combustion gas is further based on the detected admixture temperature.

9. The method as claimed in claim 1, further comprising:
detecting an exhaust gas pressure upstream of an exhaust gas turbine of a turbocharger of the internal combustion engine,
wherein the determination of the combustion gas composition of the combustion gas is further based on the detected exhaust gas temperature.

10. The method as claimed in claim 1, further comprising:
detecting structure-borne noise from a combustion during operation of the internal combustion engine,
wherein the determination of the combustion gas composition of the combustion gas is further based on the detected structure-borne noise.

11. The method as claimed in claim 1, wherein:
the determination of the combustion gas composition of the combustion gas is carried out by means of a predetermined association, wherein the predetermined association illustrates that, for an engine operating point and constant crude nitrogen oxide emissions with a falling combustion air ratio and increasing exhaust gas temperature, an inert gas proportion of the combustion gas composition increases.

12. The method as claimed in claim 1, wherein the adaptation of the operation of the internal combustion engine includes:
adapting an exhaust gas return rate in accordance with the established combustion gas composition.

13. The method as claimed in claim 12 wherein adapting the exhaust gas return rate in accordance with the established combustion gas composition includes increasing the exhaust gas return rate responsive to a reduction of an inert gas proportion of the established combustion gas composition.

14. The method as claimed in claim 1, wherein the adaptation of the operation of the internal combustion engine comprises:
adapting an ignition time of the internal combustion engine.

15. An internal combustion engine having:
a control unit is configured to carry out a method according to claim 1.

* * * * *